US012710514B1

(12) United States Patent
Solheim et al.

(10) Patent No.: US 12,710,514 B1
(45) Date of Patent: Aug. 18, 2026

(54) MULTIPATH RESOLUTION OF TOF SIGNALS

(71) Applicant: Zoox, Inc., Foster City, CA (US)

(72) Inventors: Jonathan Solheim, Santa Clara, CA (US); Yongzhe Chen, San Jose, CA (US); Shaminda Subasingha, San Ramon, CA (US); Venkata Subrahmanyam Chandra Sekhar Chebiyyam, San Francisco, CA (US); Samuel Russell Holladay, San Francisco, CA (US); Robert Nicholas Moor, San Mateo, CA (US); Harrison Thomas Waschura, Los Altos Hills, CA (US)

(73) Assignee: Zoox, Inc., Foster City, CA (US)

( * ) Notice: Subject to any disclaimer, the term of this patent is extended or adjusted under 35 U.S.C. 154(b) by 1189 days.

(21) Appl. No.: 17/553,420

(22) Filed: Dec. 16, 2021

(51) Int. Cl.
*G01S 7/4865* (2020.01)
*G01S 17/89* (2020.01)
*G01S 17/931* (2020.01)

(52) U.S. Cl.
CPC ............ *G01S 7/4865* (2013.01); *G01S 17/89* (2013.01); *G01S 17/931* (2020.01)

(58) Field of Classification Search
CPC ....... G01S 7/4865; G01S 17/931; G01S 17/89
USPC ............................................................. 356/5
See application file for complete search history.

(56) References Cited

U.S. PATENT DOCUMENTS

| | | | | |
|---|---|---|---|---|
| 9,405,008 | B2 * | 8/2016 | Raskar | G01S 17/894 |
| 2009/0140887 | A1 * | 6/2009 | Breed | G01C 21/1656 701/116 |
| 2011/0176709 | A1 * | 7/2011 | Park | G06T 7/521 382/106 |
| 2016/0363659 | A1 * | 12/2016 | Mindell | G01S 13/66 |
| 2018/0210070 | A1 * | 7/2018 | Bleyer | G01S 7/497 |
| 2022/0075071 | A1 * | 3/2022 | Bostelmann | G01S 17/894 |
| 2022/0262129 | A1 * | 8/2022 | Cao | G01S 13/931 |

OTHER PUBLICATIONS

Whyte et al., Review of Methods for Resolving Multi-path Interference in Time-of-Flight Range Cameras, 2014, Sensors, 2014 IEEE (Year: 2014).*

* cited by examiner

*Primary Examiner* — Helal A Algahaim
*Assistant Examiner* — Kara Richter
(74) *Attorney, Agent, or Firm* — EIP US LLP

(57) ABSTRACT

Techniques are described herein for determining whether multipath reflections are present in a sensed signal associated with a time-of-flight sensor. In various examples, multiple signals may be generated associated with differing wavelengths and exposure times. Such signals may be used to reference a map of values generated from, in some examples, simulations of environments in which multipath reflections are likely. The map, in turn, may provide one or more values associated with one or more distances associated with an object and a multipath reflection. Additionally, an emitted waveform may form the basis of a reference signal for demodulation of the plurality of signals to account for manufacturing, thermal, and other defects. The resultant distances may be used to filter data and remove “bad” pixels to form a resultant depth-image which may be used, for example, to control a vehicle.

16 Claims, 10 Drawing Sheets

MULTIPATH RESOLUTION OF TOF SIGNALS

BACKGROUND

A vehicle may include various sensors, which may be utilized for many different purposes. For example, sensors may be used to detect information about a surrounding environment (e.g., other vehicles, roadway conditions, pedestrians, street signs, etc.). An example of such a sensor is an indirect time-of-flight (iToF) sensor which may be used to determine the distance to one or more objects in an environment and/or the reflectivity of the object(s).

BRIEF DESCRIPTION OF DRAWINGS

The detailed description is described with reference to the accompanying figures. The use of the same reference numbers in different figures indicates similar or identical components or features.

DETAILED DESCRIPTION

This disclosure describes procedures, as well as methods, systems and computer-readable media for resolving multipath measurements generated using an indirect ToF sensor. In particular, the procedures described herein provide an efficient process for disambiguating multipath in received signals. Such procedures may be useful in various systems, including autonomous vehicles where it is important to keep track of objects around the vehicle as it moves through the environment.

Generally, the procedures described herein comprise receiving measurement data indicative of indirect ToF sensor emissions at two or more frequencies and performing a lookup of a table, based on the measurements, to determine properties of two or more objects in an environment, or scene. The table may be a lookup table, array or another suitable data object that maps properties of the measurements to properties of the two or more objects. The table itself may be generated using real or simulated data. Further, the table may be generated by assuming the reflected signals have the waveform actually emitted by the indirect ToF sensor, which may not be a pure sinusoid. Indirect ToF signals at different frequencies typically have different waveforms that diverge from a pure sinusoid in different ways. However, demodulating and disambiguating received signals may start from an assumption that the signals are pure sinusoids, this assumption can introduce errors in the results. The table may be generated using real-life signals to give more accurate results in practice.

Indirect ToF sensors, referred to from hereon as iToF sensors, provide properties of objects in an environment by detecting phase and amplitude shifts in signals reflected off the objects when compared to the signals that were transmitted. The shift in phase of the received signal indicates the distance to an object, so that a larger phase shift correlates with an object being further away from the sensor. The shift in amplitude of the signal indicates the reflectivity of the object so that a detected signal having a higher amplitude for a given phase shift correlates with the object having a higher reflectivity.

iToF sensors may be used in autonomous vehicles as part of a larger sensor system configured to monitor the position and/or heading of the vehicle as well as the position and/or heading of objects in the vicinity of the vehicle. Typically, there will be more than one object in the environment which will cause the reflected signal to comprise components corresponding to reflections of all of the objects in the environment. This affects the determined distances and reflectivities because the measured amplitude and phase shifts of the reflected signal are a result of the superposition of the different reflected signals arriving from the different objects in the environment. Such a scenario is referred to as multipath because the reflected signal has been received from more than one path through the environment.

Figure 1:
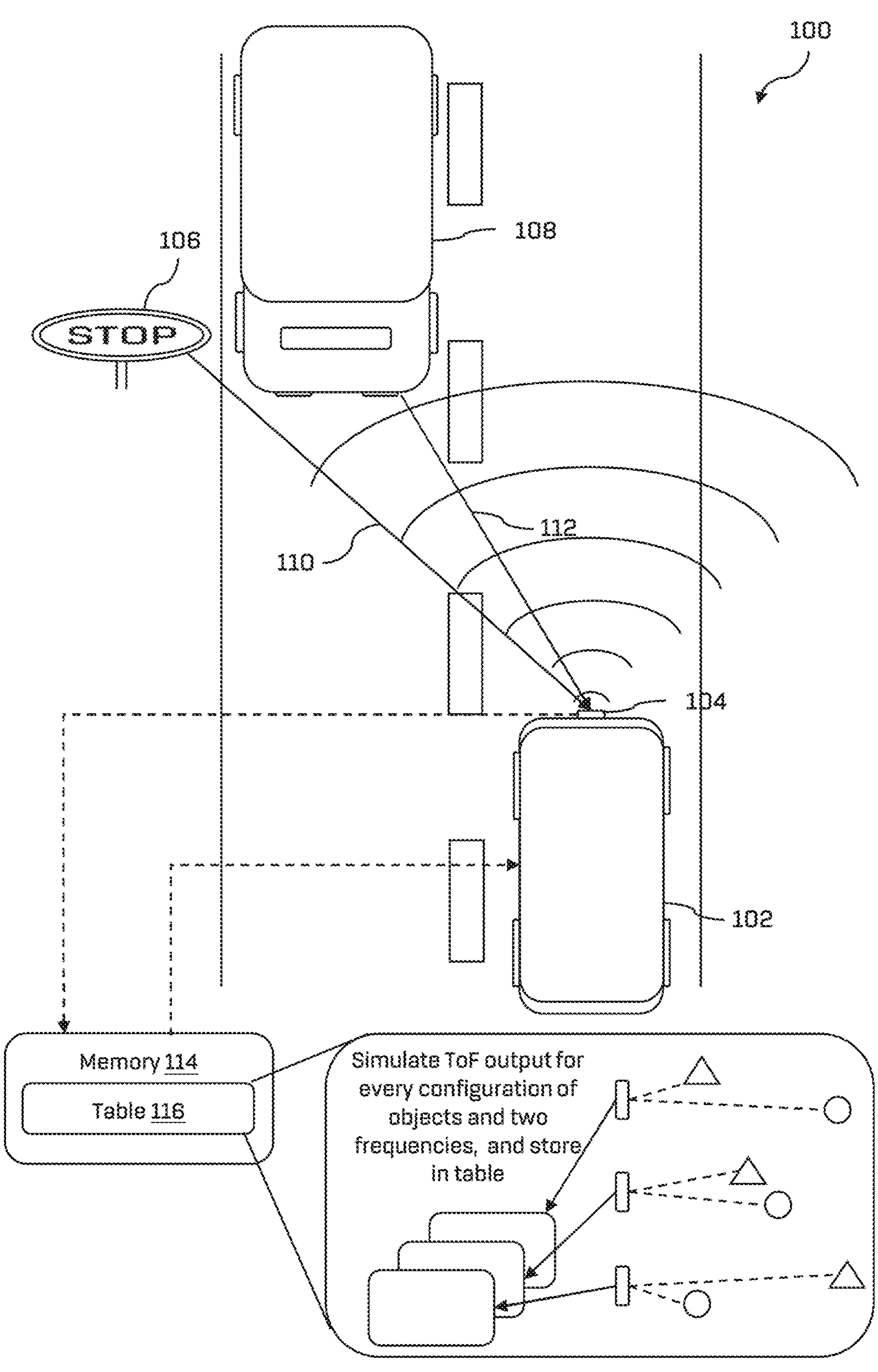
FIG. 1 is an example scenario including a vehicle.

In certain multipath scenarios, the received reflected iToF signal will contain components corresponding to signals that travel directly between the iToF sensor and the objects without interruption. Such as scenario is shown in FIG. 1 which will be described in further detail below. In some other scenarios, the received reflected iToF signal will contain a first component corresponding to a reflection off a first object in the environment which travels directly between the iToF sensor and the first object, plus a second component corresponding to a reflection off the first object and which also reflects off at least one other object in the environment before arriving at the iToF sensor. In other examples, back scatter from a lens may cause multipath. Each of these example scenarios generate multipath signals comprising a superposition of signals which have travelled along different paths before returning to the iToF sensor.

Multipath in iToF sensor systems manifests in errant measurements corresponding to assumed solitary objects in the environment when in fact there are two or more objects, or there is a single object but the signal has components from two or more different paths. In some examples, the presence of a highly reflective object, such as a retroreflector, in the environment can further affect the resolution of other objects in the environment due to the reflected signal from the highly reflective object having a high amplitude, making disambiguation challenging from smaller amplitude signals.

To reduce the effects of multipath, techniques described herein involve determining properties of objects in an environment by performing a lookup of a table based on measurements obtained from an iToF sensor operating at two or more frequencies.

Prior to performing the lookup, the data may be sampled at a discrete number of points. For example, sampling the data at four points over a single oscillation signals can allow a determination of the amplitude and phase shift of the reflected signals. The determined amplitude and phase shifts may then be used to perform the lookup. In particular, the table may map amplitude and phase shifts of two or more iToF signals (which may be at different frequencies) to properties of objects in the environment of the iToF sensor. The properties may include at least the distances between the iToF sensor and the objects. With the determined distances, the sensor system may allow an autonomous vehicle to navigate through the environment and/or may determine that one or more corrective actions need to be performed, for example to avoid colliding with at least one of the objects.

The techniques discussed herein may improve the functioning of an autonomous and/or semi-autonomous vehicle in many ways. The efficiency of the described techniques is improved over standard multipath analysis algorithms because part of the complexity of resolving multipath signals is moved to the generation of the table and is not required at runtime during operation of the vehicle.

Before performing a lookup of the table, the process may involve determining whether there is more than one object in a scene based on the at least two iToF signals. This can be done because knowledge of a first signal at a first frequency can be used to estimate an expected second signal at a second frequency if there is only a single object in the environment. A deviation of the measured second signal from the estimated second signal may imply that there is more than one object in the environment.

In one example, the process may comprise determining the difference between the actual second signal and the estimated second signal is at or above a first predetermined threshold, in which case it is assumed that there is more than one object in the environment. In a further example, the distance to an assumed single object in the environment may be determined based on the first and second signals. It may be assumed that there is more than one object in the environment if the two distances differ by more than a second predetermined threshold.

Determining there is only one object in the scene may further improve the efficiency of the process because the process of performing a lookup of the table can be streamlined, or even omitted altogether. For example, the lookup may be simplified if it is known that there is only one object in the environment.

Processing of the first and second signals may involve cross-correlating the signals with respective demodulation signals. The demodulation signals may be predetermined and/or measured based on the actual waveforms emitted by the iToF sensor. Similarly, the lookup table may be generated by cross-correlating simulated (or previously measured) iToF signals reflected off a simulated environment with demodulation signals, where one or both of the signals corresponds to actual iToF signal waveforms. The simulations may be run in software or hardware. In this way, errors that may be introduced by assuming that the iToF signals are purely sinusoidal can be removed and the accuracy of the determined distances to objects can be improved.

The actual waveforms of the iToF signals may be predetermined by measuring the signals output by the iToF sensor. In one example, the signals may be measured using a photodiode. In at least some examples, such waveforms may be estimated as a square wave or other pattern in accordance with any of the circuitry used. Predetermining the actual signals may further comprise taking the average over a plurality of cycles of the iTOF signals.

In some examples, the process may involve receiving data indicative of a signal reflected off the environment and having a shorter exposure time than the first and second signals. This data may be used to determine the distance to one of the objects in the environment, independently of the lookup of the table. Shorter exposures may exhibit less multipath than longer exposures because only the strongest reflections are detected. The determined distance can be used to improve the accuracy of the lookup of the table because the known distance can be used to narrow the search for distances to the other object(s). Efficiency and accuracy of the process is therefore further improved.

There is no theoretical limit to the number of objects resolvable using the techniques described herein. In some examples, the lookup table may be used to resolve three or more objects in an environment based on data indicative of three or more iToF signals at respective different frequencies reflected off the environment.

The table may also map the determined amplitudes and phase shifts to intensities of the reflected signals off the objects. This may provide information on the reflectivities of the objects, and may be used to perform a categorization of an object. The table may also be used to determine the distance to a single object in the environment by including entries wherein the intensity of the reflected signals off all but one of the objects are zero. In this case, using the lookup table to determine the distance to a single object may be more efficient than numerically calculating the distance.

The process may be continued to generate an image of the environment displaying information about the one or more objects therein. The process may further involve performing one or more filtering operations to remove incorrect pixels from the image. The one or more filtering operations may be used to remove noise from the image and may comprise using one or more post-processing algorithms on the image to produce a final depth map which, in turn, may be used by the vehicle.

The methods, apparatuses, and systems described herein can be implemented in a number of ways. Example implementations are provided below with reference to the following figures. Although discussed in the context of an autonomous vehicle system in some examples below, the methods, apparatuses, and systems described herein can be applied to a variety of systems. Additionally, or alternatively, the techniques described herein can be used with real data (e.g., captured using sensor(s)), simulated data (e.g., generated by a simulator), or any combination thereof.

FIG. 1 illustrates an example scenario 100 including a vehicle 102. The vehicle 102 may be an autonomous vehicle. The vehicle 102 may include a vehicle computing device and may be part of a vehicle system that includes one or more remote computing devices. The example scenario 100 involves the vehicle 102 using an iToF sensor 104 to sense objects 106, 108 in the vehicle's immediate vicinity. Measurements obtained from the iToF sensor may be used, at least in part, to control the vehicle 102. For example, the measurements may be used to determine whether one or more corrective actions need to be taken, if for example, at least one of the objects 106, 108 appear to be on a collision course with the vehicle 102.

A processing device associated with the vehicle 102 receives iToF measurement data from the iToF sensor 104. The processing device may be on the vehicle 102, or remote from, but communicatively coupled to, the vehicle 102. In one example, the processing device may be integrated with the iToF sensor 104. The measurement data comprises information on the reflected signals 110, 112 from two or more emission frequencies and/or two or more exposure lengths. In this example, there are two objects 106, 108 in the scene. The first object 106 is a stop sign at the side of the road, and the second object 108 is another vehicle. However, these objects are chosen for illustration purposes only and it is clear that any reflecting object may be present. In one example, the measurement data may correspond to the actual signals detected by the iToF sensor. In another example, the measurement data may correspond to a signal representing the cross-correlation of the reflected signal with a demodulation signal, as will be discussed with regards to FIG. 3.

In techniques discussed herein, the processing device accesses a memory 114, which may be on the vehicle 102, or remote from, but communicatively coupled to, the vehicle 102. The memory 114 comprises a table 116. The table 116 maps measured properties of the two emission frequencies to distances and intensities for two objects in an environment. As depicted in FIG. 1, the table 116 may be generated by simulating iToF measurements for every combination of distances and intensities from two objects for the two emission frequencies. The simulations used to generate the table 116 may be numerical simulations. In another example, the simulations may be actual simulations, or experiments, involving a real set up of two objects in a scene. An example process of generating a table, such as the table 116, will be described later with reference to FIG. 4A.

Therefore, the processing device accesses the table using the detected reflected signals 110, 112 to determine at least a distance to one of the objects 106, 108 in the environment. The determined distance may be used to control at least one aspect of the vehicle's operation. For example, if it is determined that an object is in the path of the vehicle, then a change may be required to the vehicle's course and/or a corrective action may be performed, such as a non-emergency stop, and emergency stop, or a change in heading of the vehicle, for example.

Figure 2:
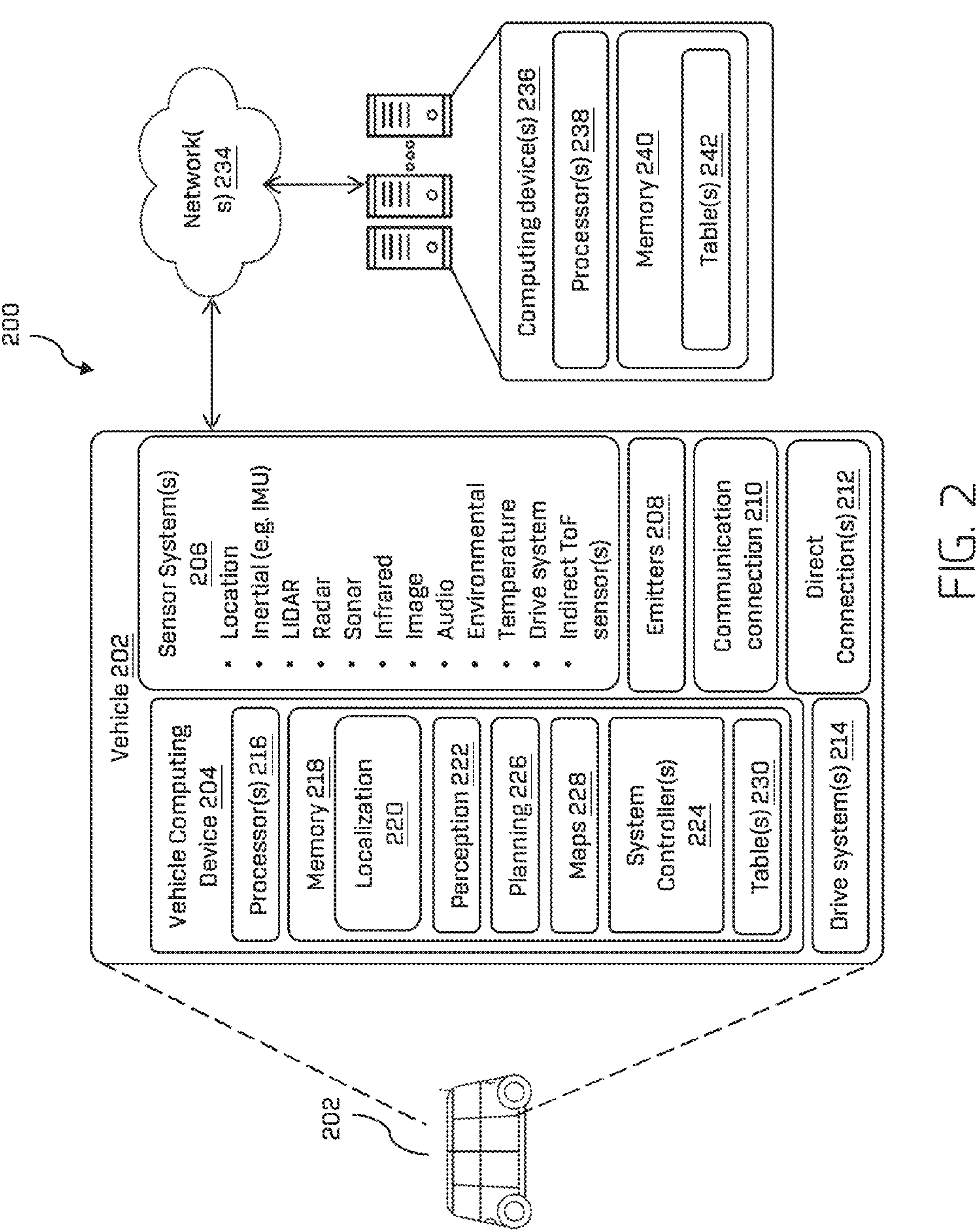
FIG. 2 depicts a block diagram of an example vehicle system.

An example of a vehicle system 200 is depicted in FIG. 2. In some instances, the vehicle system 200 may include a vehicle 202, which may correspond to the vehicle 102 of FIG. 1. In some instances, the vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 202 may be a fully or partially autonomous vehicle having any other level or classification. Moreover, in some instances, the techniques described herein may be usable in conjunction with non-autonomous vehicles as well.

The vehicle 202 may include vehicle computing device(s) 204, one or more sensor systems 206, one or more communication connections 210, at least one direct connection 212 (e.g., for physically coupling the vehicle 202 to exchange data and/or to provide power), and one or more drive systems 214.

In some instances, the sensor(s) 206 may include light detection and ranging (LIDAR) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, ToF, etc.), microphones, wheel encoders, environment sensors (e.g., temperature sensors, humidity sensors, light sensors, pressure sensors, etc.), drive system sensors for torque and/or velocity sensing etc. In particular, the sensor(s) 206 include one or more iToF sensors as described herein. The sensor(s) 206 may include multiple instances of each of these or other types of sensors. For instance, the LIDAR sensors may include individual LIDAR sensors located at the corners, front, back, sides, and/or top of the vehicle 202. As another example, the cameras may include multiple cameras disposed at various locations about the exterior and/or interior of the vehicle 202. The sensor(s) 206 may provide input to the vehicle computing device(s) 204.

The sensor(s) 206 of the vehicle 202 may be configured to provide the data as inputs to a vehicle computing device, such as the vehicle computing device(s) 204 of FIG. 2, and particularly to one or more processors for use in operating components stored in memory of the vehicle computing device. As can be seen from FIG. 2, the vehicle computing device(s) 204 may include one or more processors 216 and memory 218 communicatively coupled with the one or more processors 216. In the illustrated example, the memory 218 of the vehicle computing device(s) 204 stores a localization component 220, a perception component 222, a planning component 226, one or more maps 228, and one or more system controllers 224. Though depicted in FIG. 2 as residing in memory 220 for illustrative purposes, it is contemplated that the localization component 220, perception component 222, planning component 226 and/or the one or more maps 228 may be accessible to the vehicle 202 (e.g., stored on, or otherwise accessible by, memory remote from the vehicle 202).

An example of this remote memory is the computing device 236. The computing device 236 may include one or more processors 238 and memory 240. Although not depicted here, in some instances the computing device 236 may store the above-referenced components and controllers. The processor 216 may access these as required from the computing device 236 via the network 234 that connects the vehicle 202 and the computing device 236.

In some examples, the vehicle 202 may send operational data, including raw or processed sensor data from the sensor system(s) 206, to one or more computing device(s) 216 via the network(s) 234.

In some instances, the perception component 222 may include functionality to perform object detection, segmentation, and/or classification. In some examples, the perception component 222 may provide processed sensor data that indicates a presence of an entity that is proximate to the vehicle 202 and/or a classification of the entity as an entity type (e.g., car, pedestrian, cyclist, animal, building, tree, road surface, curb, sidewalk, unknown, etc.). In additional or alternative examples, the perception component 222 may provide processed sensor data that indicates one or more characteristics associated with a detected entity (e.g., a tracked object) and/or the environment in which the entity is positioned. In some examples, characteristics associated with an entity may include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

The sensors of the vehicle 202 may provide the data relating to the objects in the environment as inputs to a perception component of the vehicle computing device, such as perception component 222. The perception component may use the data to perform object detection, segmentation, classification, and other data processing to determine characteristics about the objects.

The perception component 222 may assign identifiers to the objects sensed in the environment to enable the object to be tracked within the environment. The perception component may determine values associated with the objects based on the data received from the sensor, to create a data object for each of the objects. It will be appreciated that, although the objects are physical objects sensed in a real-world environment by the vehicle in this example, in other examples the objects may be objects displayed and used in a simulation, or may be objects identified within video data. Simulation data may be received from a planning component such as planning component 226 or localization component such as localization component 220, or from a remote device, such as remote computing device 236. In some examples, the data may comprise map data received from the maps 228 or the other components in memory.

The localization component 220 may be configured to receive data from the sensor system(s) 206 to determine a position and/or orientation of the vehicle 202 (e.g., one or more of an x-, y-, z-position, roll, pitch, or yaw). For example, the localization component 220 may include and/or request/receive a map 228 of an environment and may continuously determine a location and/or orientation of the autonomous vehicle within the map 228.

The memory 218 further comprises one or more tables 230. The table(s) 230 map data indicative of measurements generated by the one or more iToF sensors to distances to objects in the environment around the vehicle 202, such as the objects 106, 108 shown in FIG. 1, as will be discussed further herein. As shown in FIG. 2, the table(s) 230, 242 may be stored locally on the vehicle 202, remotely on computing device(s) 236 or stored on both the vehicle 202 and the computing device(s) 236. As will be described further, the table 230, 242 may be queried, based on the iToF sensor data, and by the processor(s) 216 and/or processor(s) 238 for at least a distance to one of the objects in the environment. The received distance(s) may be used by the system controller(s) 224 to control at least one aspect of the vehicle 202.

A communication connection 210 may enable communication between the vehicle 202 and one or more other local or remote computing device(s). For instance, the communication connection(s) 210 may facilitate communication with other local computing device(s) on the vehicle 202 and/or the drive system(s) 214. Also, the communication connection(s) 208 may additionally or alternatively allow the vehicle 202 to communicate with other nearby computing device(s) (e.g., other nearby vehicles, traffic signals, etc.). The communication connection(s) 210 may additionally or alternatively enable the vehicle 202 to communicate with a computing device 236. The computing device 236 may be at a remote location from the vehicle and the vehicle may communication with the computing device 236 over a network 234.

It will be appreciated that data relating to objects 106, 108 in the environment is used as an example in FIG. 1, but that data may be transferred between different starting and target components, such as between different vehicle hardware, devices, or systems, between the vehicle and remote hardware, devices, or systems, internally between components of computing devices other than the vehicle, or between different computing devices other than vehicle. For example, within the vehicle 202, map data may be transferred from the one or more maps 228 of the vehicle memory 218 to the localization or planning components 220, 226. In some examples, data may be transferred from the planning component 226 to the system controller 224 and/or one or more emitters 208. In some examples, data may be transferred from the system controller 224 to one or more drive systems 214.

To expand, the maps 228 may be used by the vehicle 202 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, multiple maps 228 may be stored based on, for example, a characteristic (e.g., type of entity, time of day, day of week, season of the year, etc.). Storing multiple maps 228 may have similar memory requirements, but increase the speed at which data in a map may be accessed.

The system controller 224 may be configured to control steering, propulsion, braking, safety, emitters, communication, and other systems of the vehicle 202. The system controller(s) 224 may communicate with and/or control corresponding systems of the drive system(s) 214 and/or other components of the vehicle 202. The system controller (s) 224 may be communicatively coupled to one or more sensors of the vehicle sensor system(s) 206.

Emitter(s) 208 may be provided for emitting light and/or sound, and may include interior emitters to communicate with passengers of the vehicle 202 and/or exterior emitter(s) to communicate with pedestrians or other nearby vehicles.

The drive system(s) 214 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 214 may include a drive system controller which may receive and preprocess data from the sensor(s) and to control operation of the various vehicle systems. In some instances, the drive system controller may include one or more processors and memory communicatively coupled with the one or more processors. The memory may store one or more modules to perform various functionalities of the drive system(s) 214. Furthermore, the drive system(s) 214 may also include one or more communication connection(s) that enable communication by the respective drive system with one or more other local or remote computing device(s).

In some instances, aspects of some, or all, of the components discussed herein may include any models, algorithms, and/or machine learning algorithms. For example, the component(s) in the memory 220, 240 may be implemented as a neural network. As can be understood in the context of this disclosure, a neural network may utilize machine learning, which can refer to a broad class of such algorithms in which an output is generated based on learned parameters. Data may be transferred within the models/algorithms, between different models/algorithms, or between the models/algorithms and other components of the vehicle.

Figure 3:
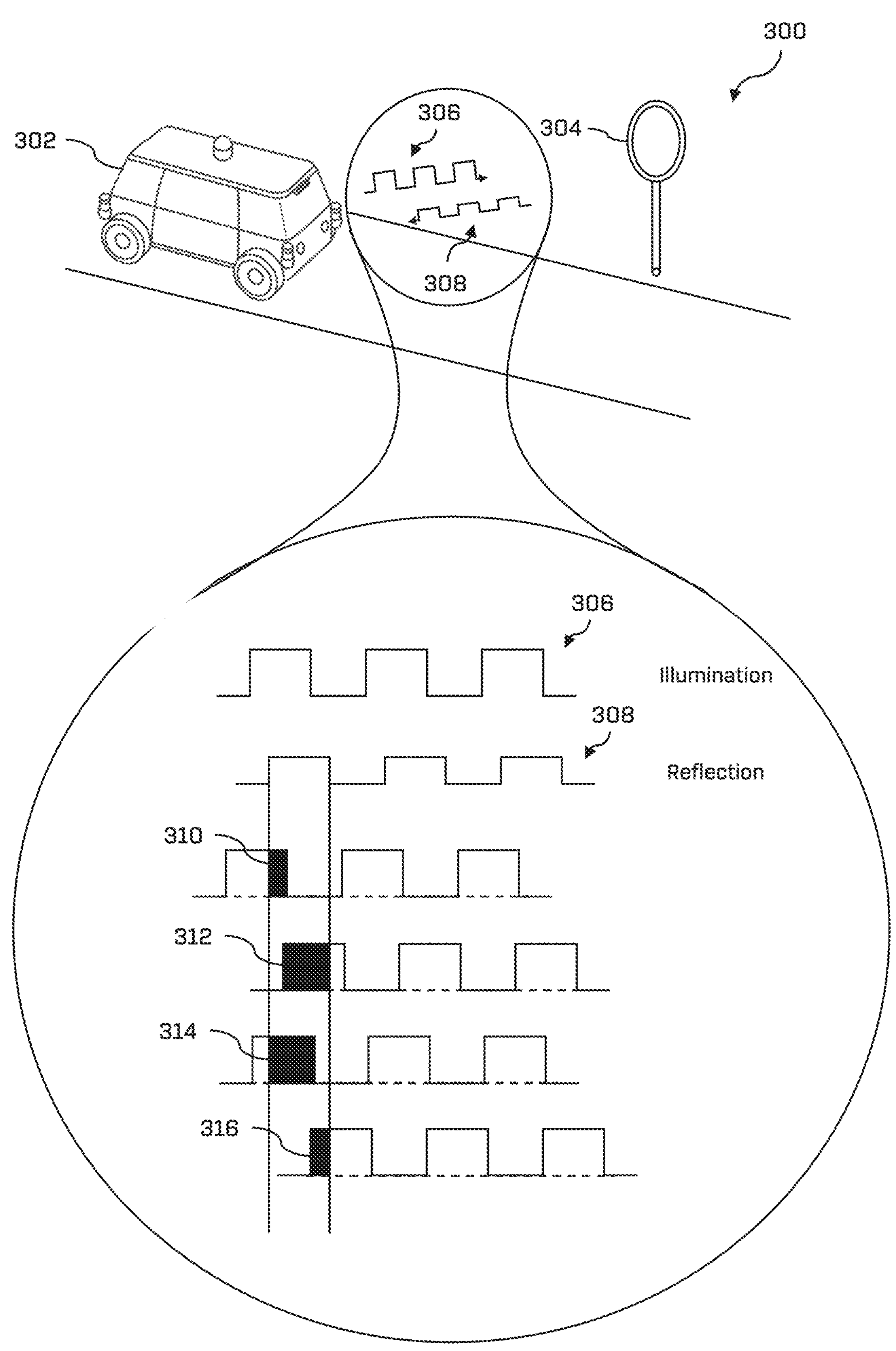
FIG. 3 depicts an example process for obtaining phase and amplitude data from an iToF signal.

As discussed, one or more iToF sensors may be included in the vehicle 202 to provide time-of-flight data indicative of distance and reflectivity of objects in the vehicle's environment. An example of the operation of an iToF sensor is illustrated in FIG. 3 which shows an example scenario 300 in which a vehicle 302 is moving through an environment. Vehicle 302 comprises an iToF sensor operating to determine properties of an object 304 in the vehicle's environment. The iToF sensor comprises an emitter configured to emit electromagnetic radiation at the first frequency indicated in FIG. 3 as a square wave 306 for clarity. (In some examples, the radiation is a sinusoidal wave, or has other shapes.) Typical frequencies of the emitters in vehicles may be in the radio band of the electromagnetic spectrum. Example frequencies may be in the range 1 MHz to 1 GHz. Examples include, but are not limited to, 13 MHz, 25 MHz, 50 MHz and 60 MHz.

The wave 306 travels through the environment until it reaches the reflective object 304, also referred to as a reflector. The reflective object 304 may be a stop sign, such as the first object 106 illustrated in FIG. 1. The wave 306 interacts with the object 304 such that it is reflected back towards the iToF sensor, indicated in FIG. 3 by the square wave 308. The physical properties of the object 304 dictate how much of the wave 306 is reflected back at the iToF sensor. In particular, the reflectivity of the object 304 causes a shift to the amplitude of the reflected wave 308 when compared with the emitted wave 306.

An important class of reflector in iToF sensing is a retroreflector. Retroreflectors are characterised by sending radiation back in the direction in which it came, and with very high reflectivity. Because of this, retroreflectors typically dominate other objects in a scene analyzed using an iToF sensor, by appearing very bright. Examples of retroreflectors include road signs and vehicle reflectors, such as bicycle reflectors.

Analyzing the amplitude of the reflected wave 308 provides information about the reflectivity of the object 304. This may provide an indication of what the object is. For example, when combined with other measurements, retroreflectors may be disambiguated from vehicles or pedestrians.

The distance to an object can be readily calculated using Equation 1 based on the phase shift, φ, of the reflected wave having wavelength, λ.

$$D = \frac{1}{2}\left(\frac{\lambda\varphi}{2\pi}\right). \qquad \text{Equation 1}$$

The phase and amplitude of the reflected wave can be obtained by cross-correlating the measured reflected wave with the transmitted signal as a demodulation signal, and sampling the cross-correlated signal at a discrete number of points. When the emitted signal is assumed to be sinusoidal, the result of cross-correlating a reflected signal having a sinusoidal waveform with a sinusoidal demodulation signal is another sinusoidal signal. This allows a simple mathematical analysis of the reflected signal because a closed form for the phase shift and amplitude can be obtained by sampling the cross-correlated signal four times at 90 degree phase shift. However, in practice the emitted waveform is typically non-sinusoidal and in fact closer to square wave for most emission frequencies. The result of performing distance analysis assuming sinusoidal waveforms on actual, non-sinusoidal, signals manifests in a so-called wiggle error wherein the calculated distance oscillates (or wiggles) about the true distance to an object, as a function of the object's distance. The sinusoidal assumption can therefore lead to errors.

FIG. 3 further shows the effect of the reflection on the reflected wave 308. For example, it can be seen that the reflected wave 308 has a smaller amplitude than the outgoing wave 306 and is shifted in phase. The reflected wave is cross-correlated with the illumination signal and sampled at four evenly spaced points over the course of one oscillation of the wave. This corresponds to sampling the cross-correlated signal at 0°, 180°, 90° and 270°. The black rectangle 310 illustrates the value of the cross-correlation of the reflected signal with the demodulation signal at 0°, which can be labelled $Q_1$. Similarly, the black rectangles 312, 314, 316 illustrate the values of the cross-correlation of the reflected signal with the demodulation signal sampled at 180°, 90° and 270° respectively, and which can be labelled $Q_2$, $Q_3$ and $Q_4$. These four values can be used to obtain the phase shift, φ, and amplitude, A, of the reflected wave using Equations 2 and 3.

$$\varphi = \tan^{-1}\left(\frac{Q_4 - Q_3}{Q_1 - Q_2}\right). \qquad \text{Equation 2}$$

$$A = \sqrt{(Q_1 - Q_2)^2 + (Q_4 - Q_3)^2}. \qquad \text{Equation 3}$$

From the calculated phase shift, the distance to the object can be obtained using Equation 1. It can be readily observed that multiple objects in the scene will cause superposition of the reflected wave such that the amplitude and phase shift indicate a non-existent single object in the environment at a distance given by Equation 1. Further, if a highly reflective object, such as a retroreflector is present, then the reflected signal may comprise a further component that has reflected off the highly reflective object, which may have little effect on the amplitude due to the high reflectivity, but may affect the phase shift of the received signal because the reflected path is longer than the direct path. This may provide a further source of ambiguity. In this case, the phase shift is a result of the superposition of the reflected waves. As discussed above, iToF sensors may include emitters operating at more than one frequency to resolve more than one object in the environment. Performing the cross-correlation procedure on each of the emission frequencies amplifies the errors inherent in the models. As will be discussed herein, the presently described techniques may use actual measured waveforms of the signals emitted by an iToF sensor to perform the distance and reflectivity calculations.

In practice then, the iToF sensor in the scenario 300 uses multiple modulation frequencies to determine information about the environment, in particular, when the environment is such that reflected signals may include multipath. In the case where there are two objects in the environment (such as in the scenario shown in FIG. 1), the detected signals at each of the modulation frequencies will each comprise a component from a reflected signal from a first object and a component from a reflected signal from a second object. In particular, assuming two iToF emission frequencies are utilized, the resulting measurements, $v_1$ and $v_2$, can be written according to Equations 4 and 5.

$$v_1 = x_1 e^{\frac{2\pi d_1}{\lambda_1}} + x_2 e^{\frac{2\pi d_1}{\lambda_1}}. \qquad \text{Equation 4}$$

$$v_2 = x_1 e^{\frac{2\pi d_1}{\lambda_2}} + x_2 e^{\frac{2\pi d_1}{\lambda_2}}. \qquad \text{Equation 5}$$

Here, $x_1$ is the intensity of the reflected signal off the first object, $x_2$ is the intensity of the reflected signal off the second object, $d_1$ is the distance between the iToF sensor and the first object, $d_2$ is the distance between the iToF sensor and the second object, $\lambda_1$ is the wavelength of the first iToF signal, and $\lambda_2$ is the wavelength of the second iToF signal.

Equations 4 and 5 are based on the following assumptions:

i) the two modulation signals report the same intensity and distance for a single reflection. In other words, the reflector's reflectivity is wavelength independent.

ii) neither distance nor intensity can be negative. This is a physical constraint on the equations.

iii) The number of objects present is less than or equal to the number of modulation signals. For example, Equations 4 and 5 illustrate the measurements from two modulation signals with two objects in the environment. The equations are therefore solvable because there are 4 unknowns ($x_1$, $x_2$, $d_1$, $d_2$) and 4 equations (corresponding to the real and imaginary components of the Equations 4 and 5). This naturally generalizes to n equations relating to measurements from n modulation signals at different frequencies required to resolve n objects in the environment.

In practice, it is difficult to solve Equations 4 and 5 for $x_1$, $x_2$, $d_1$ and $d_2$ in closed form. In techniques discussed herein, a processing device accesses a memory, which may be on the vehicle, or remote from, but communicatively coupled to, the vehicle. The memory may comprise a table or other suitable data structure. The table maps measured amplitude and phase values from the two emission frequencies to distances and intensities for two objects in an environment. As discussed above, the table may be generated by simulating or measuring iToF measurements for different combinations of distances and intensities from two objects for the two emission frequencies. The simulations used to generate the table may be numerical simulations. An example process of generating a table is described later with reference to FIG. 4A.

The processing device searches the table for the values of $v_1$ and $v_2$, or the closest values that exist in the table, and reads off the corresponding distances and intensities. With this, the processing device can determine information about the environment and therefore determine whether action needs to be taken. For example, if it is determined that an object is in the path of the vehicle, then a change may be required to the vehicle's course and/or a corrective action may be performed, such as a non-emergency stop, and emergency stop, or a change in heading of the vehicle, for example.

To narrow down the search of the lookup, an initial estimate of the distance to one of the objects in the environment may be obtained by using a short exposure of an iToF signal. The short-exposed signal may be at the lower frequency of the two modulation signals discussed above as this provides the maximum range the two signals. The short-exposed signal may be used to identify the distance to a retroreflector, or more generally a highly reflective object, in the environment. This may narrow the search of the table because one of the unknowns in Equations 4 and 5 is removed. In particular, the search of the table may be limited to searching for a distance matching, or near to, the determined distance based on the short exposure signal.

In some cases, an element of the table with the exact measured properties will not exist, possibly due to the discrete nature of the table. In this case, the process may involve selecting the closest element in the table having the most similar properties to those measured. In other examples, the process may involve interpolating between at least the two nearest elements in the table to determine the distance to at least one of the objects in the environment.

The process may be repeated over the whole 2D range of the iToF sensor to generate an image providing information of the object(s) in the environment. For example, the distance and reflectivity may be expressed in the image. The process may further involve one or more filtering operations to remove noise and/or incorrect pixels from the generated iToF image to generate an accurate depth image of the environment.

Figure 4A:
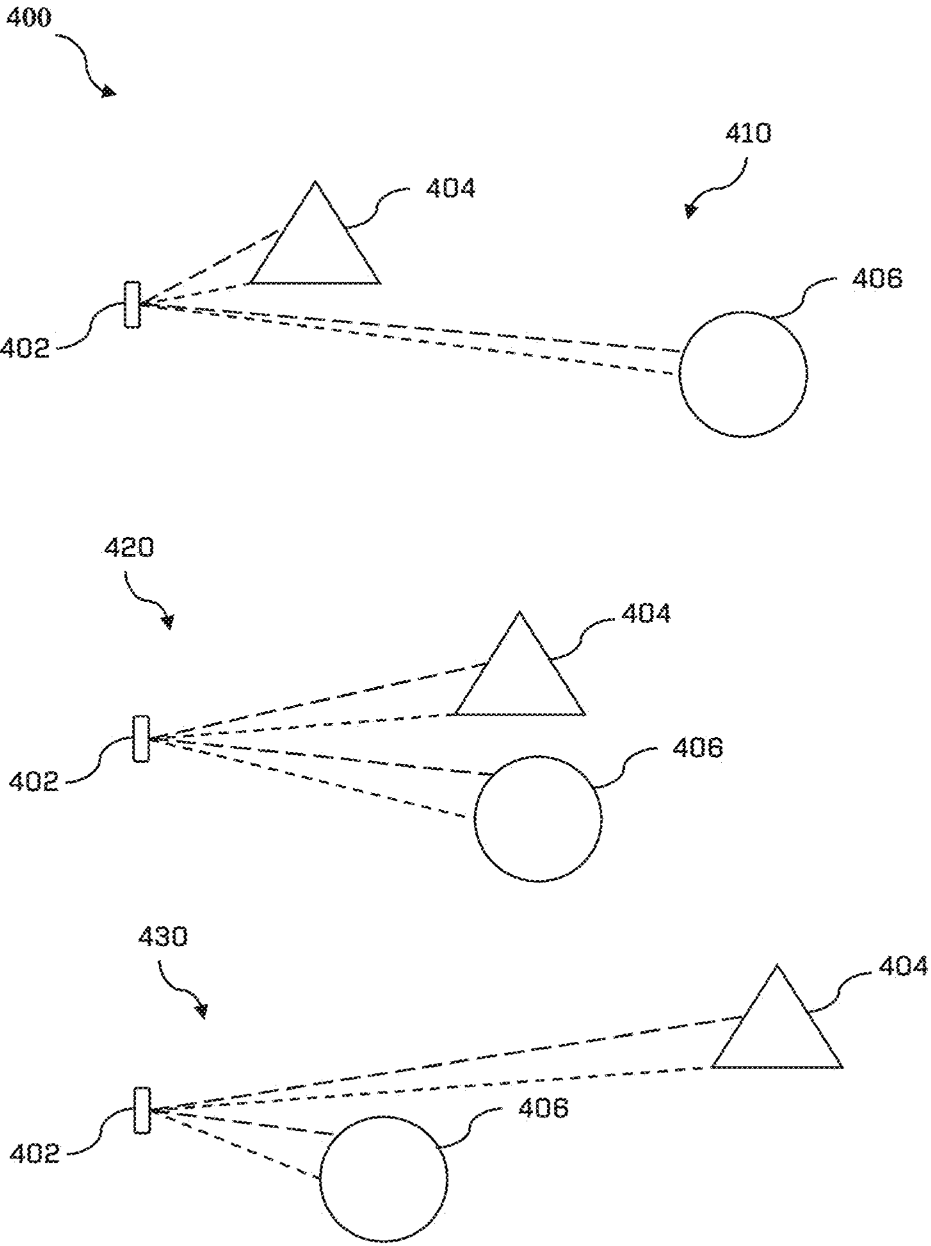
FIG. 4A illustrates example configurations for generating values that map measured iToF data to distances and intensities of objects in an environment.

FIG. 4A illustrates examples that can be used to generate a lookup table (LUT) mapping measured properties of reflected iToF signals to distance and intensities associated with two objects in a scene. Note, that while the examples involve multipath for two objects in the scene, this is for illustration only. A LUT may be generated based on any number of objects in the scene using the techniques described herein. In particular, there is no theoretical limit to the number of objects resolvable using a lookup table generated according to this disclosure.

The examples involve simulating the backscatter results from an iToF sensor for every combination of distance and reflectivity for two objects in the environment of the iToF sensor, three examples are depicted in FIG. 4A for clarity, but it will be appreciated that in practice many more examples will be used, determined by constraints such as the desired resolution and/or memory to be occupied by the LUT. The simulating may be performed numerically in software wherein the objects and the signals are simulated.

The examples an iToF sensor 402 operating at two different modulation frequencies. Signals are shown in FIG. 4A using dashed lines, with the length of the dashes indicative of the wavelength of the respective signals, such that the shorter dashed lines indicate signal having a higher frequency (shorter wavelength). As mentioned above, the iToF sensor and its operation may be simulated in software, such as MATLAB.

Figure 4B:
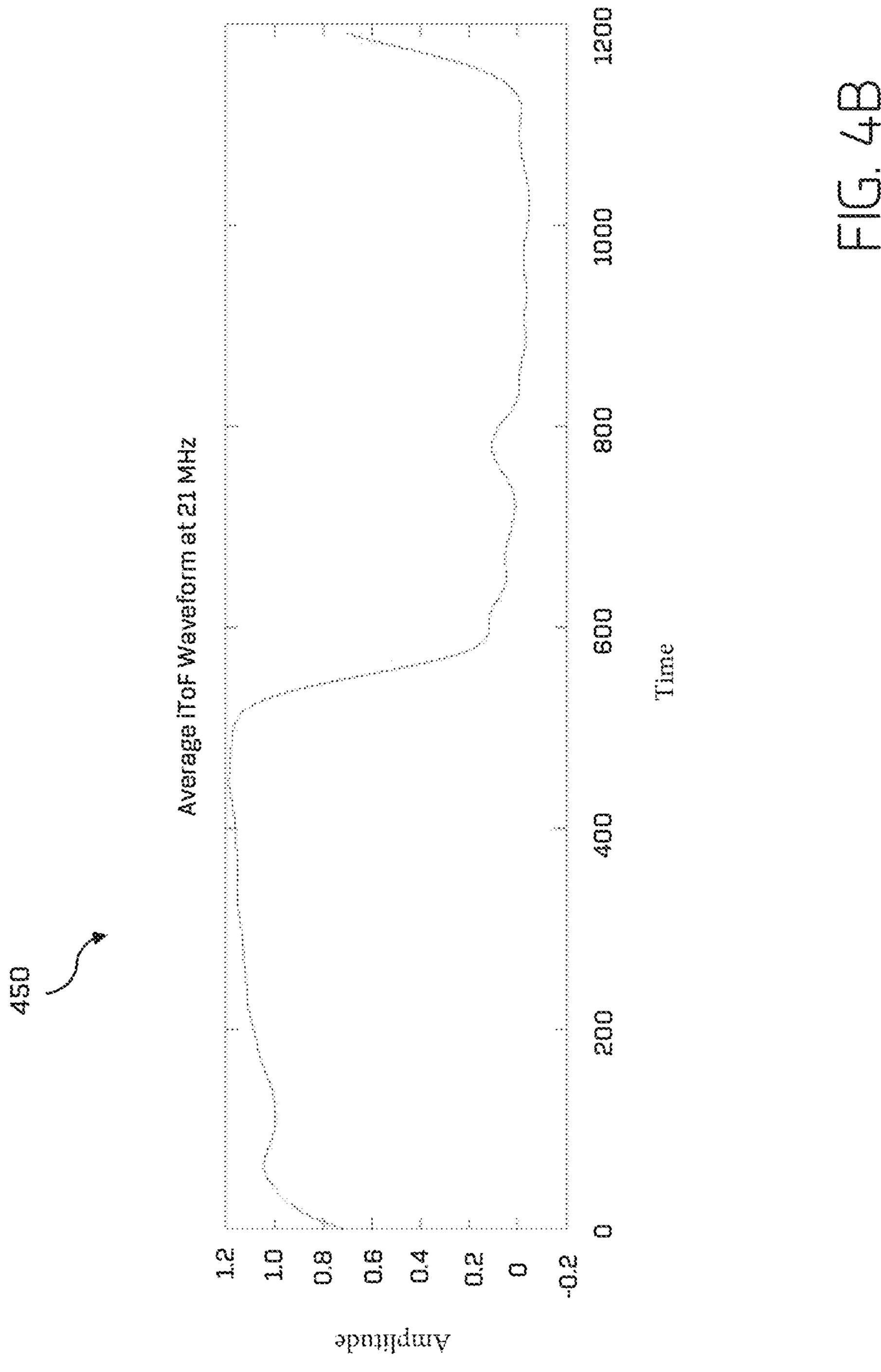
FIG. 4B depicts an actual waveform of an iToF signal.

In one example, the actual waveforms of the two emission signals may be measured prior to performing the simulation 400. The actual waveforms may be measured using a photodiode, for example. In this way, the simulation can be made more accurate than a simulation that assumes sinusoidal wave signals. FIG. 4B shows an example waveform 450 emitted by an iToF sensor at 21 MHz, as measured by a photodiode. It can be observed that the actual waveform is not perfectly sinusoidal.

There may be inherent variability in the waveform due to thermal factors within components of the sensor system and manufacturing tolerances. Therefore, in an example, the determined actual waveform may be obtained from a plurality of measurements of the signals, from a single sensor system and/or from a plurality of sensor systems. In one example, the plurality of waveforms may be averaged to generate an average waveform for the signal at a certain modulation frequency. In this way, the average waveform may better characterize the shape of the simulated waveform.

The waveforms of the emission signals may vary across different frequencies, and may also vary between different iToF sensors, the LUT may be generated for the iToF sensor that will be used in practice. In this case, an LUT may be generated for every different iToF sensor. In other examples, the LUT may be specific to a particular design of iToF sensor system.

In scenario 410, the simulation involves a first object 404 at a first position in the scene, and a second object 406 at a second position in the scene. The first and second positions are at known distances to the iToF sensor 402. Similarly, the first and second objects have known reflectivities. In the scenario 410, the first object is closer to the iToF sensor 402 than the second object. The iToF sensor emits signals at the first and second frequencies and records the resultant reflected signals. The emissions may be performed one at a time so that measurement data from each emission frequency is collected separately. Alternatively, the emissions may be performed simultaneously, with signal processing being applied to separate the two signals from the received combined signal.

As discussed above, each reflected signal will be a superposition of reflected waves comprising a component corresponding to reflection off the first object 404 and a component corresponding to reflection off the second object 406. The recorded reflected signals may then be analyzed, as discussed above, to obtain respective amplitudes and phase shifts of the signals. In some examples, this involves cross-correlating the reflected signals with a demodulation signal having the same, or similar, waveform as the emitted signal. Where a numerical simulation is assuming the actual waveforms of the signals, the demodulation signal may be selected to have the same, or similar, waveform as the emitted signal. For example, the demodulation signal may correspond to the measured signal actually emitted by the iToF sensor. Alternatively, the demodulation signal may be an approximation of the actual signal. In some examples, the approximation of the actual signal may be a square wave having substantially the same frequency and amplitude as the actual waveform. In some examples, the demodulation signal may correspond to a demodulation signal used in practice, such as a square wave. The cross-correlated signal may then be sampled at a discrete number of points to obtain information about the signal. In one example, this involves using a quadrature sampling technique to determine the $Q_1$ to $Q_4$ values as shown in FIG. 3.

From these values, the simulation 400 involves mapping the $Q_1$ to $Q_4$ values, or corresponding amplitude and phase shifts, for the different modulation frequencies to the distances to the first and second objects and the first and second objects reflectivities. The number of input variables, and therefore the size of the resulting table, can be reduced by first calculating the amplitude and phase shift of the signals according to Equations 2 and 3, and then calculating $v_1$ and $v_2$ according to Equations 4 and 5 and mapping these to the distances and reflectivities of the two objects 404, 406. In this case, the table can be reduced from an eight-dimensional look up to a four-dimensional look up, although in both cases the number of entries is the same (corresponding to the particular simulation or experimental setup that gave those results). This scenario 410 therefore describes how a first point in the table may be generated.

The simulation 400 then moves to the scenario 420 wherein the objects 404 and 406 are placed in new positions. The simulation then proceeds as in the scenario 410. In particular, measurements of the environment are obtained at the two modulation frequencies and a new element in the table is generated that maps the updated distances of the objects 404, 406 and the reflectivities of the objects 404, 406 to the measured data. Thus, the scenario 420 may be used to generate a second point in the table.

The simulation 400 then proceeds to 430, wherein the objects 404, 406 are placed at further new positions in the environment. Further measurements are obtained used to map the measurements to the distances and reflectivities of the objects 404, 406. Thus, the scenario 430 may be used to generate a third point in the table.

Continuing the simulation 400 for different positions of the two objects 404, 406 generates a set of mappings for the two objects at fixed reflectivities. The simulation 400 may be repeated for all possible positions to a given, or a subset of all possible positions. Where a subset is used, the spacing between different relative distances may be constant, such as 1 mm, 5 mm, 10 mm or other distance, or variable, for example increasing as the distance of the nearest object increases. The simulation 400 may be continued by selecting new objects having different reflectivities. For example, the simulation may involve holding the reflectivity of the first object fixed 404, while obtaining all measurement data for the various distances of the two objects 404, 406 and reflectivities of the second object 406. Then the reflectivity of the first object 404 may be changed and all measurement data may be obtained for the various distances of the two objects 404, 406 and reflectivities of the second object 406.

One may appreciate that the number of different combinations of position of the two objects required to generate data in the table may be very large in practice. Therefore, numerical simulation is a useful tool in generating the table. Further, using the actual measured waveforms of the signals emitted by the iToF sensor in the simulation provides accurate results when the table is used in practice.

FIG. 4A shows an example in which two objects 404, 406 are used to generate data for a lookup table. The resulting lookup table comprises entries which map measured quantities corresponding to two iToF signals to corresponding distances and intensities associated with the two objects 404, 406. This is for illustration purposes only, and the number of objects resolvable using this simulation is not limited to two. The number of objects that can be resolved requires, at the minimum, the same number of iToF modulation frequencies. This causes the dimensionality of the lookup table to grow exponentially. For example, for a scenario in which n objects are resolvable using the table, and the table maps amplitudes and phase shifts to distances and intensities, the table is a 2n dimensional array, wherein each entry in the table comprises 2n values.

With a lookup table available, for example, generated using a simulation similar to that shown in FIG. 4A, measurement data from a real iToF sensor may be analyzed to determine distances to actual objects. Furthermore, because the lookup table may have been generated using actual measured waveforms, problems such as wiggle error associated with assuming sinusoidal signal waveforms are reduced.

Figure 5:
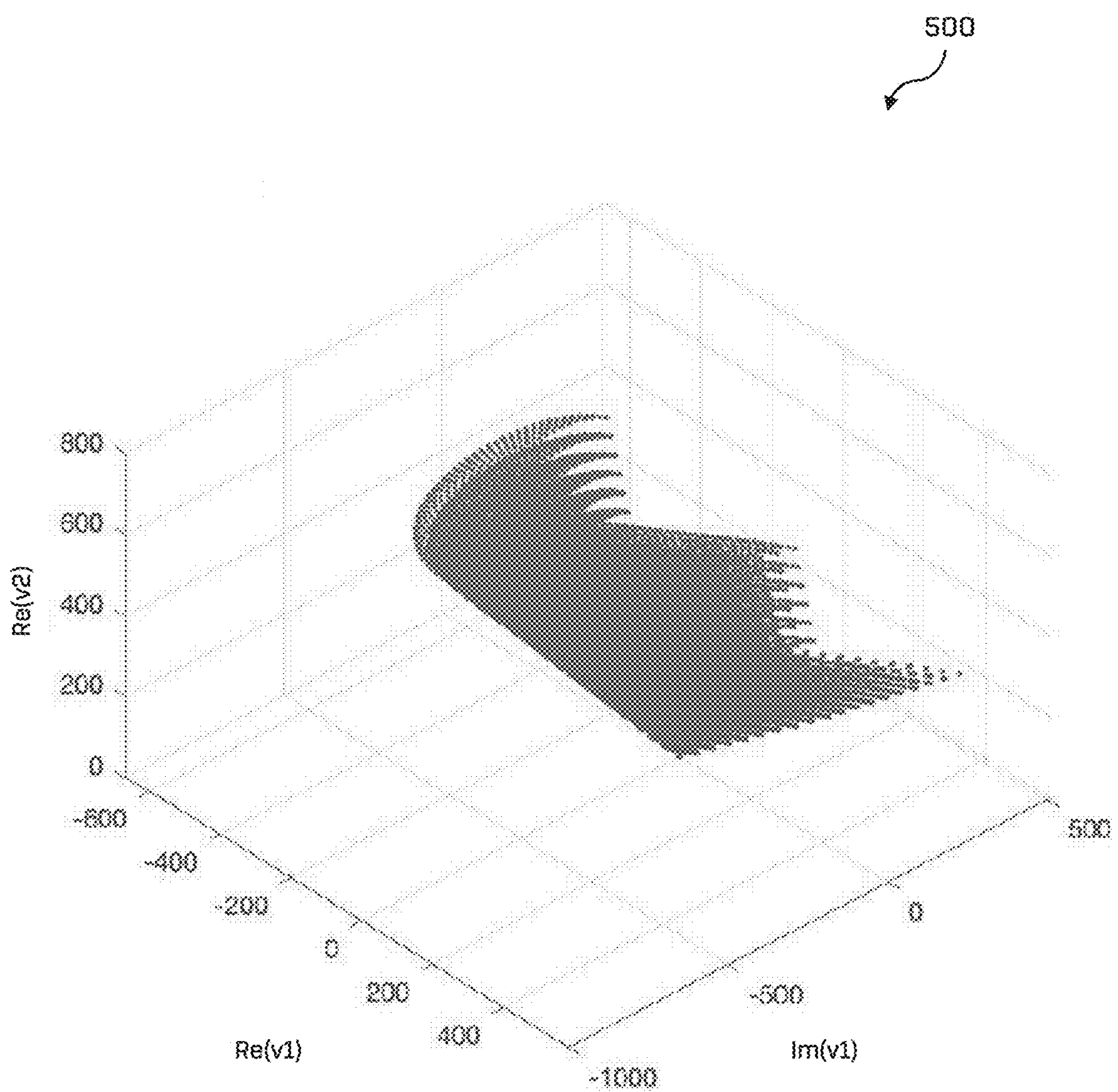
FIG. 5 shows example values generated using the example configurations of FIG. 4A.

FIG. 5 illustrates a graphical depiction 500 of data elements generated using the process 400, visualized here in 3 dimensions showing the distance to the real and imaginary parts of $v_1$ and the real part of $v_2$. the imaginary part of $v_2$ is fixed for this view, but is also a variable. In the visualization, each dot represents a point having values $Re(v_1)$, $Im(v_1)$, $Re(v_2)$, and a constant value of $Im(v_2)$. Each data element has associated data for distances and intensities of the two objects 404, 406 used to generate that element. A processing device may query the data elements for matching, or similar, values obtained from simulated or measured iToF signals to determine at least a distance to one object in an environment.

Figure 6:
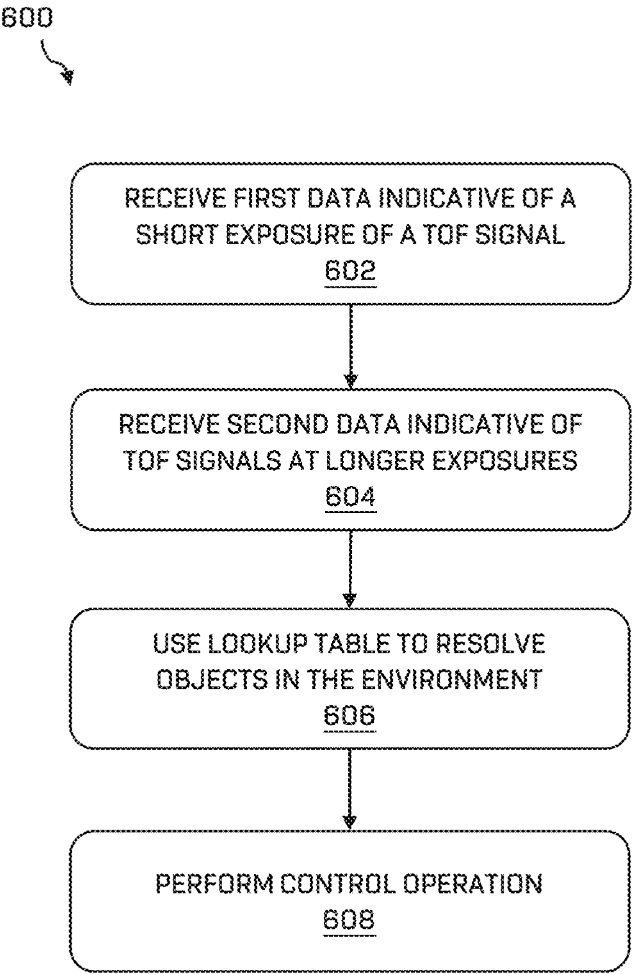
FIG. 6 depicts a flow chart of an example multipath resolution process.

FIG. 6 illustrates a flow chart of an example multipath resolution process 600. The multipath resolution process 600 may be performed by a processing device operating on an autonomous vehicle, or on a processing device in communication with an autonomous vehicle. The processing device may for example be the processor(s) 206, 238. The processing device may be caused to execute the process 600 by computer-readable instructions stored on a non-transitory computer-readable medium.

As can be seen in FIG. 6, the process 600 includes, at block 602, receiving first data indicative of a first reflected iToF signal having a relatively short exposure time. The exposure time of the first reflected wave is shorter than the exposure time of, for example, the received signals that will be used to resolve multipath at block 604. Typical exposure times of the first reflected iToF signal may be in the range 1 μs to 1 ms, such as 100 μs to 500 μs. These figures are not meant to be limiting and it is understood that the exposure time of the first reflected iToF signal is lower than the exposure time of the two iToF signals at block 604.

The first data can be used to determine the distance to one of the objects in the environment, when that object is more reflective than other objects in the environment. This is particularly useful to disambiguate a retroreflector from other reflectors. In this case, a short exposure of an iToF signal will be able to distinguish the retroreflector from other reflectors in the environment because the retroreflector will appear much brighter in comparison to the other reflectors using only a short exposure, and so can be easily disambiguated from the other reflectors.

The effect on the detected reflected wave is that it is substantially similar to a reflected signal in the case where the retroreflector is the only object in the environment. The short exposure of the signal ensures that the reflected signals from the other objects in the scene have little effect on the reflected signal because they are of comparatively small magnitude, perhaps not detectable at all. Therefore, when a retroreflector is present, the first data can be utilized to determine a distance to the retroreflector. This narrows down the future search of the lookup table because one of the unknowns is obtained. This can help select a more appropriate point in the table when the points within the look up table are dense and give different distance and intensity results for relatively small changes between the values used to query the look up table.

The process 600 further includes, at block 604, receiving second data indicative of at least two iToF signals that have been received by an iToF sensor, wherein the two iToF signals have a longer exposure time than the first reflected iToF signal. The at least two signals have reflected off an environment and provide information about objects in the environment.

To distinguish more than one object in the environment, the iToF sensor will use at least two different modulation frequencies, as discussed above. Example frequencies include, but are not limited to, 1 MHz, 8 MHz, 13 MHz, 25 MHz, 50 MHz. These examples correspond to resolution distances of roughly 150 m, 19 m, 11 m, 6 m and 3 m, respectively. The use of at least two modulation frequencies may allow objects at various distances to be resolved and potentially determine whether multipath is present in the measurement data. In general, the number of modulation frequencies corresponds to the maximum number of objects which can be disambiguated.

The second data received by the processing device at 604 may directly correspond to the measured signals obtained by the iToF sensor. The second data may be a recorded signal sampled at a discrete number of points. In this case, the processing device may need to perform additional processing on the second data to obtain information about the reflected signals. For example, the processing device may also receive data associated with the emitted signals as they are emitted. The processing device may be configured to perform a cross-correlation process, similar to that discussed with regards to FIG. 3, between the received signal and the emitted signal. Further, the processing device may be configured to sample the cross-correlated signals at a discrete number of points. In one example, this may involve using a quadrature sampling technique to obtain at least the values $Q_1$ to $Q_4$ corresponding to each signal.

In another example, the second data received by the processing device at 604 may correspond to pre-cross-correlated signals. The cross-correlation may take place in hardware or software associated with the iToF sensor, and the resulting signals may be transmitted to the processing device at block 604. The processing device may then be configured to sample the cross-correlated signals at a discrete number of points to obtain at least the four values $Q_1$ to $Q_4$.

In yet another example, the second data received by the processing device may correspond to pre-sampled, pre-cross-correlated, signal data. The pre-sampling in this case may be performed by another processing device associated with the iToF sensor, and transmitted to the processing device.

In any case, the cross-correlation process may match the simulated cross-correlation process used to generate the lookup table, for example as discussed with regards to FIG. 4A. That is, the detected signals may be cross-corelated with the same demodulation signal that was used to generate the table so that the real-time processing closely matches the simulated processing.

At block 606, the process 600 includes using a lookup table to resolve objects in the environment. The lookup table may be a similar table that is generated according to the process 400 discussed in FIG. 4A. In particular, the table maps parameters, such as the $Q_1$ to $Q_4$ values or amplitude and phase shift values, associated with the received data to, at least, distances to objects in the environment. In some examples, the table maps parameters to both the distances to the objects and the intensities of the reflected signals off the objects.

The processing device may use values in the first and second received iToF measurement data to search the table for similar values in the table. For example, if the table has been generated to map $Q_1$ to $Q_4$ values to distances and intensities of objects in an environment, then $Q_1$ to $Q_4$ values in the data may be used to select a point in the table with the same, or similar $Q_1$ to $Q_4$ values. The processing device may then read off a distance to at least one of the objects that are stored in the table in association with the (or similar) $Q_1$ to $Q_4$ values.

In the case where the iToF sensor generates measurement data corresponding to two modulation frequencies, $Q_1$ to $Q_4$ values may be obtained for each signal so that there will be two sets of $Q_1$ to $Q_4$ values.

As the table is generated for a discrete number of points, elements having the exact measured parameters may not exist in the table. Searching the lookup table for associated values may involve using one or more tools to select a closest point in the table to the measured parameters. In one example, the lookup may involve using a Kd-tree on points that are near the measured values. The closest point in the Kd-tree may then be selected as the point to obtain associated distances from.

In further examples, when elements having the exact measured parameters do not exist in the table, the lookup may involve performing an interpolation process to obtain distances. The interpolation process may involve determining distances based on at least the two nearest points in the table. The interpolation may be bilinear, bicubic, etc.

As discussed above, the first data received at block 602 may be used to narrow the search of the lookup table at block 606 because, in this case, the number of unknowns is reduced. This means that a point in the table may be selected when it is determined that one of the objects matches, or is close to, the distance determined from the first reflected iToF signal.

Resolving the objects in the environment may further comprise performing one or more filtering operations on the received data. The one or more filtering operations may be used to remove noise from the determined distance(s) in order to produce a more accurate representation of the environment. For example, the lookup of the table may be used to generate an image of environment. The one or more filtering operations may involve performing post-processing on the image to remove incorrect pixels in the image.

At block 608, the process 600 involves performing a control operation based on at least the determined distance to one of the objects. When the process 600 is performed in association with an autonomous vehicle, the control operation may involve continuing on an existing course through the environment, if it is determined that the detected objects are not in the way. In another example, the control operation may involve changing a course to avoid a potential collision. In any case, the control operation is informed by the determination of the distances to the objects.

The determined distances to the objects may be combined with measurement data from one or more other sensor systems to provide a more complete picture of the environment around the vehicle. For example, measurement data indicative of a current heading and velocity of the vehicle may be used in combination with the determined distances to determine whether the vehicle will collide with the object. The control operation may be further based on such an analysis.

It is understood that block 602 may be performed after, or at the same time as, block 604 so that the first data may be received after, or at the same time as, the second data.

Figure 7:
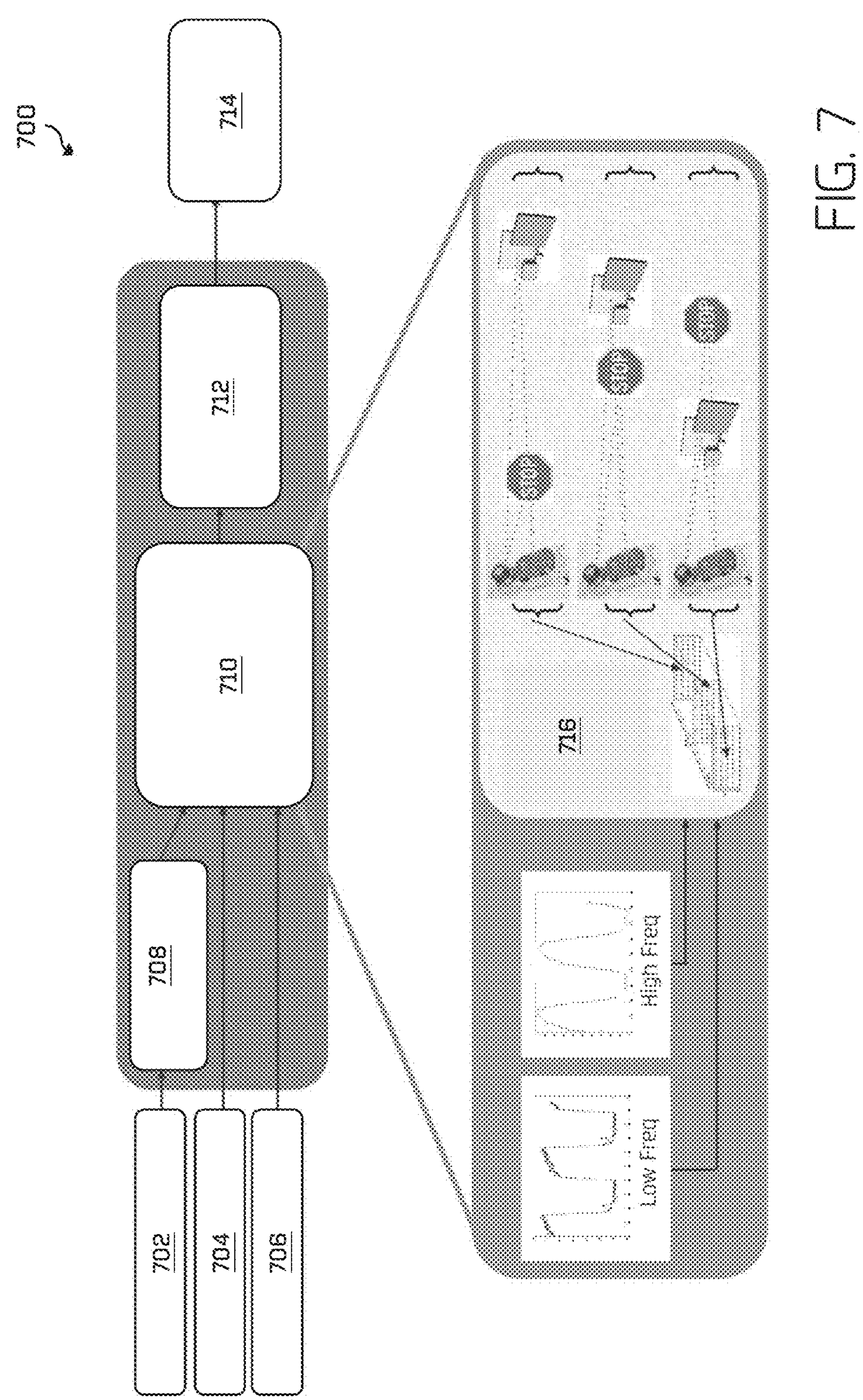
FIG. 7 depicts an example process flow showing further aspects of the example multipath resolution process.

FIG. 7 shows an example flow diagram 700 of another example process. The flow diagram 700 comprises real-time processing at blocks 702-714, as well as pre-processing to build a look up table at block 716. In particular, the flow 700 involves, at block 702, receiving first data indicative of a reflected iToF signal at a first frequency and at a relatively short exposure as well as, at blocks 704 and 706, second data indicative of reflected iToF signals at the first frequency and a second frequency at a relatively long exposure. The operation of these may be the same as blocks 602 and 604 discussed above. At block 708, the first data may be used to determine a distance to a first object in the scene, in this case a retroreflector.

Further, processing of the second data may be performed to obtain properties of the long exposure signals required to perform a lookup of a lookup table. As discussed above, the properties may include the $Q_1$ to $Q_4$ values, or amplitude and phase shifts derived from the $Q_1$ to $Q_4$ values. The determined properties may be used, at block 710, and along with the determined distance to the retroreflector, to query the lookup table for an element that matches, or is similar to, the determined properties. As shown, the lookup table may be generated in a pre-processing operation at block 716, using simulated iToF output in a similar manner to what has been described with reference to FIG. 4A. In this way, disambiguation can require reduced real-time processing, benefitting from the pre-processing to generate the lookup table.

The query of the lookup table at block 710 returns at least a distance to the second object in the environment, the distance to the first object having been already determined from the short exposure signal. The flow 700 further involves, at block 712, filtering noise and removing incorrect pixels to, at block 714, generate a corrected depth image of the environment.

Figure 8:
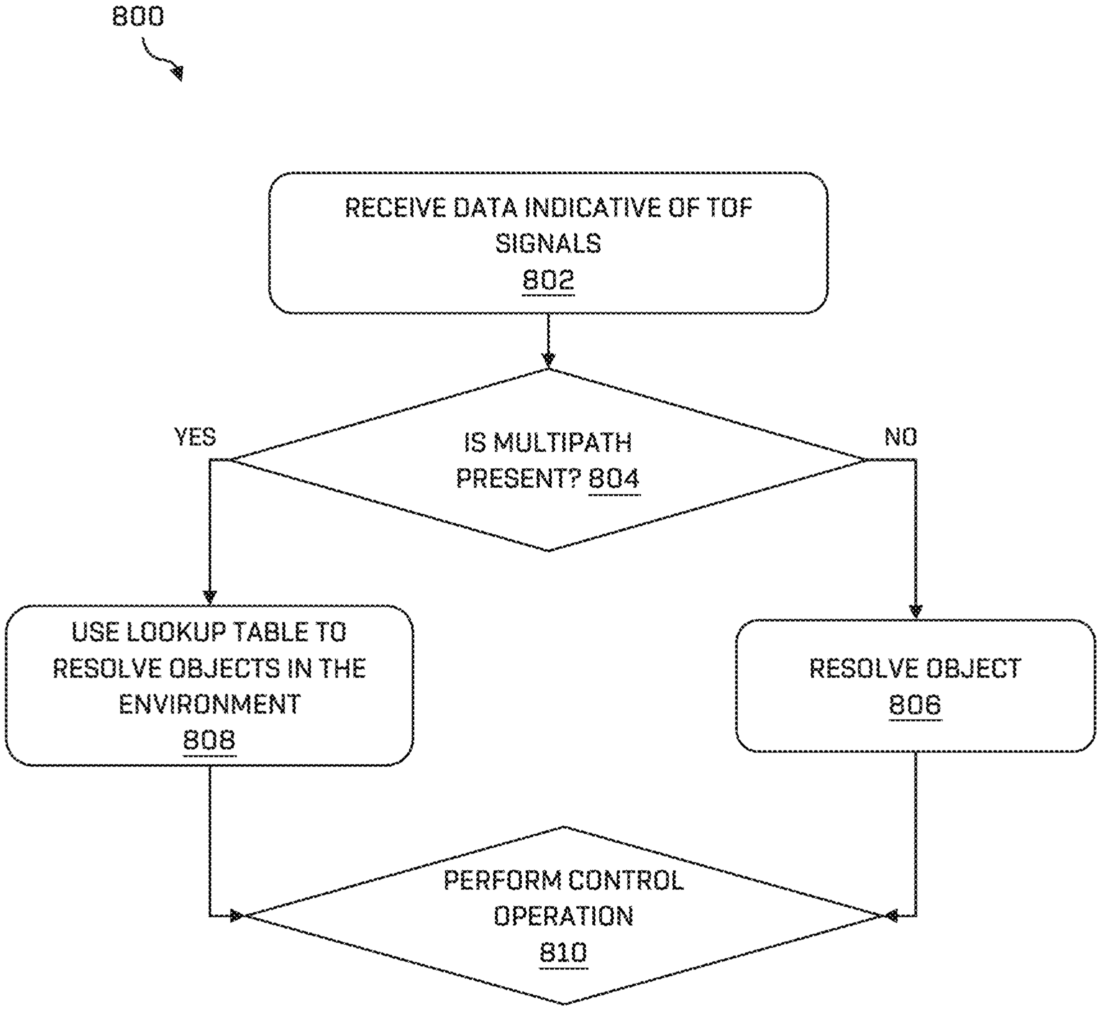
FIG. 8 depicts a flow chart of yet a further example multipath resolution process.

FIG. 8 illustrates a flow chart of a further example multipath resolution process 800. The multipath resolution process 800 may be performed by a processing device operating on an autonomous vehicle, or on a processing device in communication with an autonomous vehicle. The processing device may for example be the processor(s) 206, 238. The processing device may be caused to execute the process 800 by computer-readable instructions stored on a non-transitory computer-readable medium.

At block 802, the process 800 involves receiving data indicative of iToF signals. That is, block 802 may be performed in a similar manner to block 604 of the process 600.

At block 804, the process 800 involves determining whether multipath is present based on the data received at block 802. Determining multipath may increase efficiency of the process 800 because if multipath can be ruled out, a lookup using a table may be omitted in determining distance to the object. The existence of multipath on the data may be determined based on what would be expected in a second iToF signal based on a measurement of a first iToF signal.

In one example, determining that multipath is present involves assuming a single object in the environment, and calculating the distance to that object based on the measurement data corresponding to the different iToF signals. If the calculated distances differ beyond a predetermined threshold amount, it may be assumed that multipath is present. The predetermined threshold may be, but not limited to, 0.5 m, 1 m, 5 m and 10 m.

Figure 9:
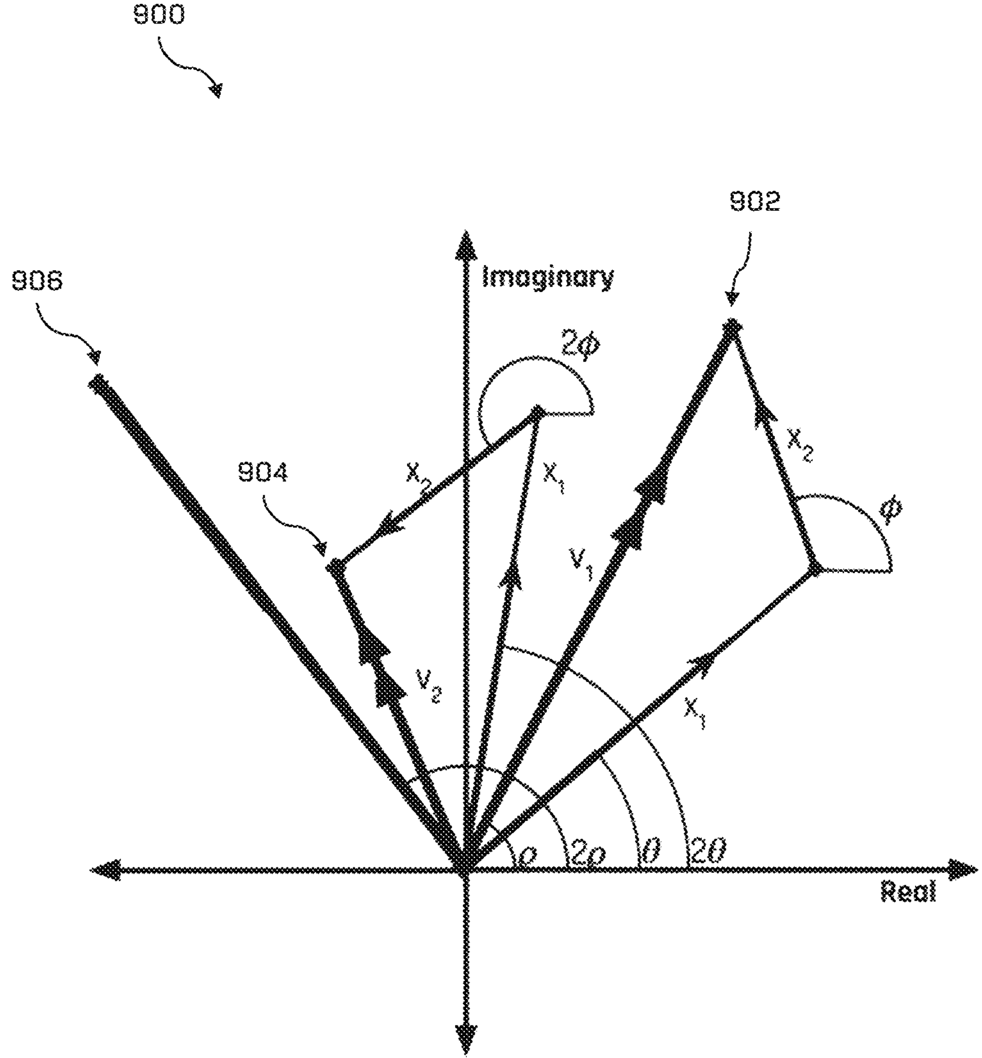
FIG. 9 illustrates example phasors corresponding to reflected signals in a multipath scenario.

An alternative analysis may involve using both the amplitude and phase shifts of the reflected signals to determine whether multipath is present. FIG. 9 shows an example phasor diagram 900 that may be used to determine whether multipath is present in iToF measurement data. The phasor diagram 900 illustrates the measured amplitude and phase shift values from two iToF signals. In this example, a first signal has a frequency of 25 MHz and a second signal has a frequency of 50 MHz.

A first phasor 902 represents the amplitude and phase shift of a reflection of the first signal. As illustrated in the phase diagram 900, the first phasor 902 is composed of the sum of two phasors corresponding to the reflected signal off first and second objects in the environment. Specifically, the first phasor 902 is the sum of a phasor with amplitude $x_1$ and angle $\theta$ and a phasor with amplitude $x_2$ and angle $\phi$. The first phasor 902 is essentially an example illustration of $v_1$ in Equation 4.

An angle $\rho$ is subtended between the first phasor 902 and the positive real axis. Without prior knowledge that there is more than one object in the environment (so that it cannot be determined that the first phasor 902 is the sum of two phasors corresponding to reflections off the objects) a second phasor corresponding to a reflection of the second signal can be estimated. Based on the first phasor 902, it can be estimated that the second phasor should have the same amplitude as the first phasor 902 (this is assumption i) discussed with regards to Equations 4 and 5 that the intensities of reflected signals is frequency independent). Further the estimated second phasor should subtend an angle of 2*p* with the positive real axis because the second signal is at twice the frequency of the first signal. The estimated second phasor 906 is illustrated in FIG. 9.

The actual measured second phasor 904 is also shown in FIG. 9. As can be observed, the second phasor 904 differs in both amplitude and phase shift from the estimated second phasor 906. This difference is due to the presence of two objects in the environment, each contributing respective reflected signal phasors to the second phasor 904. Specifically, the second phasor 904 is the sum of a phasor with amplitude $x_1$ and angle 2θ and a phasor with amplitude $x_2$ and angle 2θ. The second phasor 904 is therefore essentially an example illustration of $v_2$ in Equation 5.

In one example, the difference between the second phasor 904 and the estimated second phasor 906 may be used to indicate whether multipath is present. For example, if the difference between the second phasor 904 and the estimated second phasor 906 is above a predetermined threshold, then it may be determined that multipath is present. The predetermined threshold may be based on the resolution of the iToF system.

If it is determined that multipath is not present, then the process 800 proceeds to block 806, wherein the single object in the environment is resolved. Resolving a single object in the environment may comprise using one or more of the iToF signals to determine a distance. This may involve determining the phase shift of the reflected signal and determining the distance to the object using Equation 1. To obtain a potentially more accurate result, the phase shift of each of the modulation signals used by the iToF sensor may be used to obtain a set of distances. An average of the set of distances may then be determined to provide an estimated distance to the object.

In a further example, a lookup table, such as the lookup table used in the processes 600 or 700 may be able to resolve a single object in a scene. That is, the lookup table may include entries in which the intensity associated with all but one of the objects is zero, indicating that only one object is present. The determination of whether multipath is present may be used to select a point in the table that corresponds to only a single non-zero intensity. In this case, the process of resolving a single object may be made more efficient. In another example, the lookup table may include entries in which the distances associated with all but one object are larger than the maximum distance resolvable with the iToF sensor and/or zero. An entry in the lookup table having an associated distance that is larger than that resolvable by the iToF sensor or zero may indicate that there is no object in the environment.

If it is determined that multipath is present at block 804, then the process may proceed to block 808, wherein a lookup of the table is performed to determine at least distances to the objects in the environment. That is, block 808 may be done in correspondence with block 606 of the process 600.

After the object(s) in the environment have been resolved, the process 800 proceeds to block 810, wherein a control operation is performed. That is, block 810 may be performed in correspondence with block 608.

It is understood that the process 800 may further include block 602 of the process 600 so that a distance to one of the objects may be determined before using the lookup table to determine the distance(s) to the object(s) in the environment. That is, block 602 may be included in the process 800 before, at the same time as, or after block 802, or before, at the same time as, or after block 804. In particular, when block 602 is included in the process 800, the lookup of the table can be narrowed as discussed above.

While discussion above had focused on disambiguating signals received from different objects which are superimposed, it will be appreciated that the techniques can equally be applied to disambiguating multipath signals received from a single object via multiple different paths.

Example Clauses

A: A method comprising: causing an indirect time-of-flight, iToF, sensor to emit an emitted signal at a first frequency for a first duration; receiving, at a detector associated with the iToF sensor, a first reflected signal; determining, based at least in part on the first reflected signal, a distance to a first object in the environment; causing the iToF sensor to emit a second signal at the first frequency for a second duration longer than the first duration; receiving, at the detector, a second reflected signal; causing the iToF sensor to emit a third signal at a second frequency for the second duration; receiving, at the detector, a third reflected signal; performing a query of a lookup table based at least in part on the distance, the second reflected signal, and the third reflected signal; receiving, in response to the query, a distance to a second object in the environment; and generating instructions to control a vehicle based at least in part on the determined first and second distances.

B. The method of Clause A, further comprising: receiving first and second reference signals corresponding to the second and third reflected signals; and performing, based at least in part on the first and second reference signals and one or more of the first, second, or third reflected signals, a demodulation, wherein performing the query is further based at least in part on the demodulation.

C. The method of Clause A or Clause B, further comprising: determining a first estimated phase associated with the second reflected signal; determining a second estimated phase associated with the third reflected signal; and determining, based at least in part on the first and second estimated phases, that multipath is present.

D. The method of any of Clauses A to C, wherein the processing device is further configured to: perform, based at least in part on the query, a filtering operation to generate filtered data; and generate a depth map based on the filtered data, wherein controlling the vehicle is based at least in part on the depth map.

E. A system comprising: an indirect Time-of-Flight, iToF, sensor system; and a processing device configured to: receive a first signal corresponding to a time-of-flight measurement; receive a second signal corresponding to an additional time-of-flight measurement at a second frequency, different from the first frequency; determine, based at least in part on the first and second signals, whether multipath reflections are present in an environment; determine, by performing a lookup of a table and based at least in part on determining the presence of multipath reflections and the first and second signals, a distance to a first object in the environment and a distance to a second object in the environment; and generate a signal indicative of the first and second distances.

F. The system of Clause E, wherein the processing device is further configured to: receive first and second reference signals corresponding to the first and second reflected signals; and perform, based at least in part on the first and second reference signals and one or more of the first or second reflected signals, a demodulation, wherein performing the query is further based at least in part on the demodulation.

G. The system of Clause E or Clause F, wherein the processing device is further configured to: receive a reflected signal associated with a first exposure and the second frequency; and determine, based on the reflected signal, an estimated distance, wherein determining the first and second distances are further based at least in part on the estimated distance.

H. The system of any of Clauses E to G, wherein the table is generated based at least in part on: executing a set of simulations comprising a first object and a second object at a plurality of relative distances to a simulated time-of-flight sensor; determining, based at least in part on the set of simulations, a plurality of values associated with simulated reflections off of the first and second objects; and storing, as the lookup table, a map associating the plurality of values with the plurality of distances.

I. The system of Clause H, wherein the set of simulations are performed using waveforms that are predetermined from measurements on the first and second signals.

J. The system of any of Clauses E to I, wherein the processing device is further configured to: perform, based at least in part on the query, a filtering operation to generate filtered data; and generate a depth map based on the filtered data.

K. The system of Clause J, wherein the processing device is further configured to control a vehicle based at least in part on the depth map.

L. The system of any of Clauses E to K, wherein elements of the table represent a mapping of data, indicative of third and fourth signals having the same waveforms as the first and second signals, to distances and reflectivities of objects in an environment, the waveforms of the first and second signals having been measured by observing actual emissions of the time-of-flight sensor.

M. The system of any of Clauses E to L, wherein the processing device is further configured to: receive third data indicative of a third signal at a third frequency different from the first and second frequencies, the third signal corresponding to a time-of-flight measurement representing a third reflection off the scene; and further determine, by performing a lookup of the table and based on the first, second and third data, a distance to a third object in the scene and a third intensity of the reflected first, second and third signals from the third object.

N. One or more non-transitory computer-readable media storing instructions executable by one or more processors, wherein the instructions, when executed, cause the one or more processors to perform operations comprising: receive a first signal corresponding to a time-of-flight measurement; receive a second signal corresponding to an additional time-of-flight measurement at a second frequency, different from the first frequency; determine, based at least in part on the first and second signals, whether multipath reflections are present in an environment; determine, by performing a lookup of a table and based at least in part on determining the presence of multipath reflections and the first and second signals, a distance to a first object in the scene and a distance to a second object in the environment; and generate a signal indicative of the first and second distances.

O. The one or more non-transitory computer-readable media of Clause N, wherein the instructions further cause the one or more processors to: receive first and second reference signals corresponding to the first and second reflected signals; and perform, based at least in part on the first and second reference signals and one or more of the first or second reflected signals, a demodulation, wherein performing the query is further based at least in part on the demodulation.

P. The one or more non-transitory computer-readable media of Clause N or Clause O, wherein the instructions further cause the one or more processors to: receive a reflected signal associated with a first exposure and the second frequency; and determine, based on the reflected signal, an estimated distance, wherein determining the first and second distances are further based at least in part on the estimated distance.

Q. The one or more non-transitory computer-readable media of any of Clauses N to P, wherein the lookup table is generated based at least in part on: executing a set of simulations comprising a first object and a second object at a plurality of relative distances to a simulated time-of-flight sensor; determining, based at least in part on the set of simulations, a plurality of values associated with simulated reflections off of the first and second objects; and storing, as the lookup table, a map associating the plurality of values with the plurality of distances.

R. The one or more non-transitory computer-readable media of Clause Q, wherein the set of simulations are performed using waveforms that are predetermined from measurements on the first and second signals.

S. The one or more non-transitory computer-readable media of any of Clauses N to R, wherein the instructions further cause the one or more processors to: perform, based at least in part on the query, a filtering operation to generate filtered data; and generate a depth map based on the filtered data.

T. The one or more non-transitory computer-readable media of Clause S, wherein the instructions further cause the one or more processors to control a vehicle based at least in part on the depth map.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

What is claimed is:

1. A system comprising:

an indirect Time-of-Flight, iToF, sensor system; and a processing device configured to:

receive a first signal corresponding to a time-of-flight measurement at a first frequency;

receive a second signal corresponding to an additional time-of-flight measurement at a second frequency, different from the first frequency;

determine, based at least in part on the first and second signals, whether multipath reflections are present in an environment;

determine, by performing a lookup of a table and based at least in part on determining the presence of multipath reflections and the first and second signals, both a distance to a first object in the environment and a distance to a second object in the environment, the table relating a combination of the first signal and second signal to a set of distances comprising the distance to the first object and the distance to the second object; and generate a signal indicative of the first and second distances.

2. The system of claim 1, wherein the processing device is further configured to:

receive first and second reference signals corresponding to the first and second signals; and perform, based at least in part on the first and second reference signals and one or more of the first or second signals, a demodulation, wherein performing the lookup is further based at least in part on the demodulation.

3. The system of claim 1, wherein the processing device is further configured to:

receive an additional signal associated with a first exposure and the second frequency; and determine, based on the additional signal, an estimated distance, wherein determining the first and second distances are further based at least in part on the estimated distance.

4. The system of claim 1, wherein the table is generated based at least in part on:

executing a set of simulations comprising a first simulated object and a second simulated object at a plurality of relative distances to a simulated time-of-flight sensor;

determining, based at least in part on the set of simulations, a plurality of values associated with simulated reflections off of the first and second simulated objects; and storing, as the table, a map associating the plurality of values with the plurality of distances.

5. The system of claim 4, wherein the set of simulations are performed using waveforms that are predetermined from measurements on the first and second signals.

6. The system of claim 1, wherein the processing device is further configured to:

perform, based at least in part on the lookup, a filtering operation to generate filtered data; and generate a depth map based on the filtered data.

7. The system of claim 6, wherein the processing device is further configured to control a vehicle based at least in part on the depth map.

8. The system of claim 1, wherein elements of the table represent a mapping of data, indicative of third and fourth signals having waveforms corresponding to waveforms of the first and second signals, to distances and reflectivities of objects in an environment, the waveforms of the first and second signals having been measured by observing actual emissions of the time-of-flight sensor.

9. The system of claim 1, wherein the processing device is further configured to:

receive third data indicative of a third signal at a third frequency different from the first and second frequencies, the third signal corresponding to a time-of-flight measurement representing a third reflection off the scene; and further determine, by performing a lookup of the table and based on the first, second and third data, a distance to a third object in the scene and a third intensity of the first, second and third signals from the third object.

10. One or more non-transitory computer-readable media storing instructions executable by one or more processors, wherein the instructions, when executed, cause the one or more processors to perform operations comprising:

receive a first signal corresponding to a time-of-flight measurement at a first frequency;

receive a second signal corresponding to an additional time-of-flight measurement at a second frequency, different from the first frequency;

determine, based at least in part on the first and second signals, whether multipath reflections are present in an environment;

determine, by performing a lookup of a table and based at least in part on determining the presence of multipath reflections and the first and second signals, both a distance to a first object in the scene and a distance to a second object in the environment, the table relating a combination of the first signal and the second signal to a set of distances comprising the distance to the first object and the distance to the second object; and generate a signal indicative of the first and second distances.

11. The one or more non-transitory computer-readable media of claim 10, wherein the instructions further cause the one or more processors to:

receive first and second reference signals corresponding to the first and second signals; and perform, based at least in part on the first and second reference signals and one or more of the first or second signals, a demodulation, wherein performing the lookup is further based at least in part on the demodulation.

12. The one or more non-transitory computer-readable media of claim 10, wherein the instructions further cause the one or more processors to:

receive an additional signal associated with a first exposure and the second frequency; and determine, based on the additional signal, an estimated distance, wherein determining the first and second distances are further based at least in part on the estimated distance.

13. The one or more non-transitory computer-readable media of claim 10, wherein the lookup table is generated based at least in part on:

executing a set of simulations comprising a first simulated object and a second simulated object at a plurality of relative distances to a simulated time-of-flight sensor;

determining, based at least in part on the set of simulations, a plurality of values associated with simulated reflections off of the first and second simulated objects; and storing, as the table, a map associating the plurality of values with the plurality of distances.

14. The one or more non-transitory computer-readable media of claim 13, wherein the set of simulations are performed using waveforms that are predetermined from measurements on the first and second signals.

15. The one or more non-transitory computer-readable media of claim 10, wherein the instructions further cause the one or more processors to:

perform, based at least in part on the lookup, a filtering operation to generate filtered data; and generate a depth map based on the filtered data.

16. The one or more non-transitory computer-readable media of claim 15, wherein the instructions further cause the one or more processors to control a vehicle based at least in part on the depth map.

* * * * *